Nov. 1, 1927.

W. N. JOHNSON

SAW GUARD

Filed Aug. 3, 1925

W. N. Johnson
INVENTOR

BY Victor J. Evans
ATTORNEY

L. B. James
WITNESS:

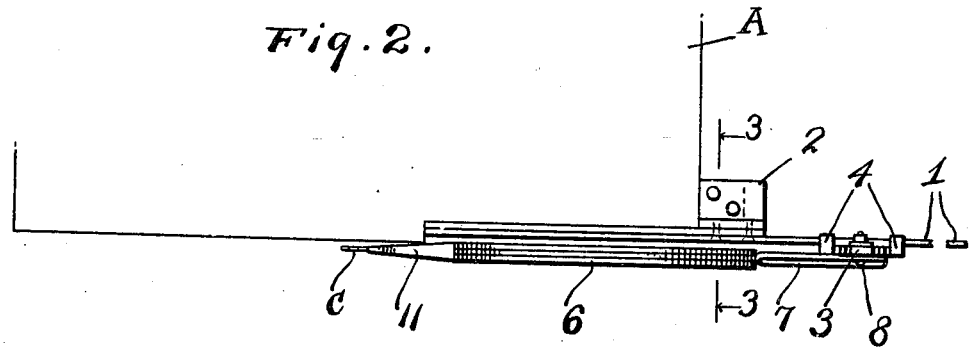
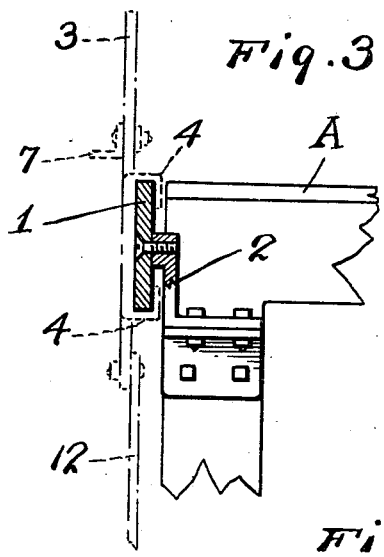
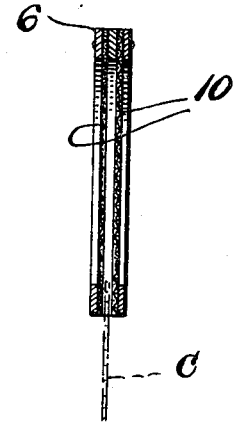
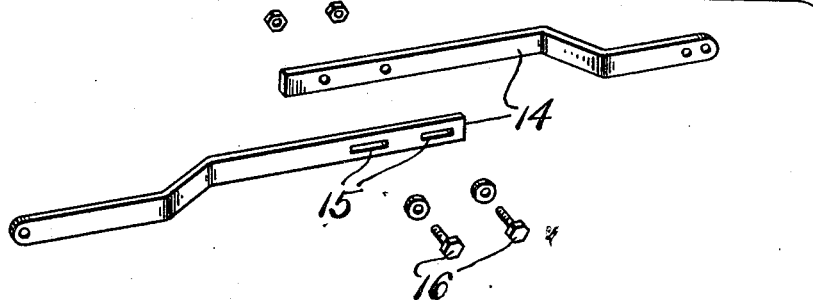

Patented Nov. 1, 1927.

1,647,868

UNITED STATES PATENT OFFICE.

WILLIAM N. JOHNSON, OF NEENAH, WISCONSIN.

SAW GUARD.

Application filed August 3, 1925. Serial No. 47,961.

This invention relates to improvements in saw guards for the "slasher" type saw, the general object of the invention being to provide a guard which will move with the saw so that the saw is guarded at all times.

Another object of the invention is to so arrange the parts that the guard can be easily moved away from the saw to permit the saw to be changed or otherwise acted on.

A further object of the invention is to make the device adjustable so that it can be used on different sizes of saw devices.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a plan view of Figure 1.

Figure 3 is a section on line 3—3 of Figure 2.

Figure 4 is a section on line 4—4 of Figure 1.

Figure 5 is a view showing the adjustable link with its parts separated.

Figure 1:
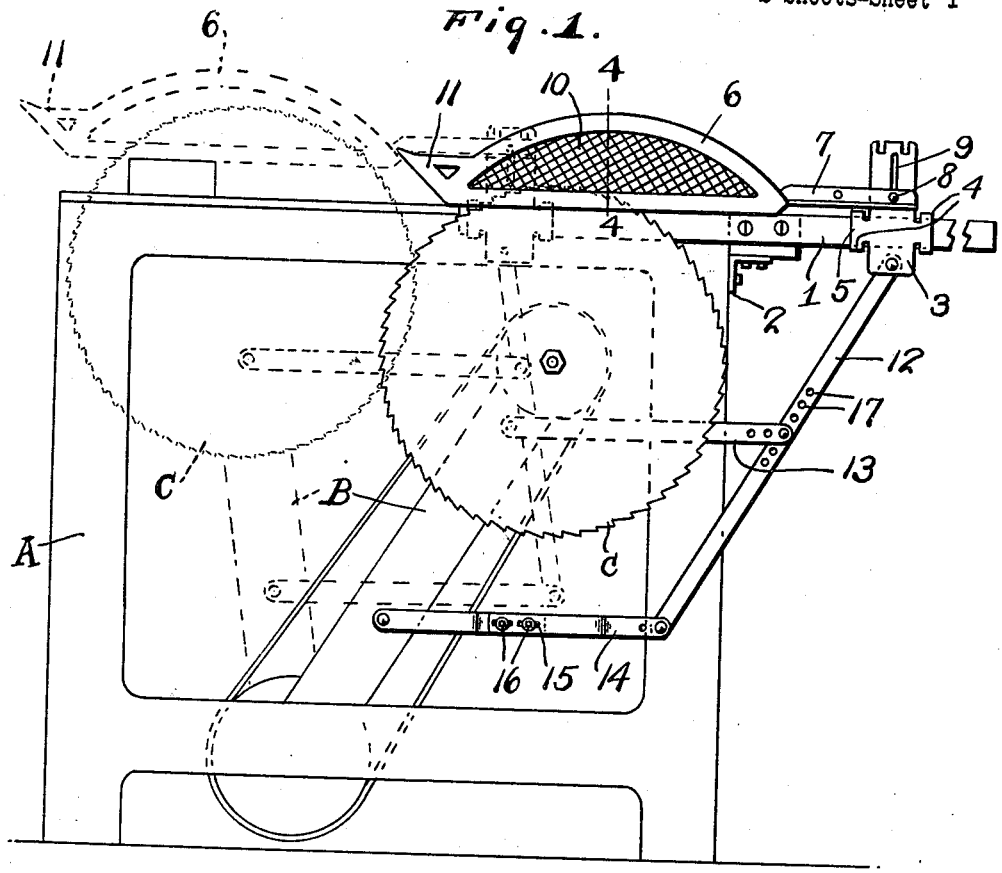
Figure 1 is a view of a saw device with the invention applied thereto.
Figure 6:
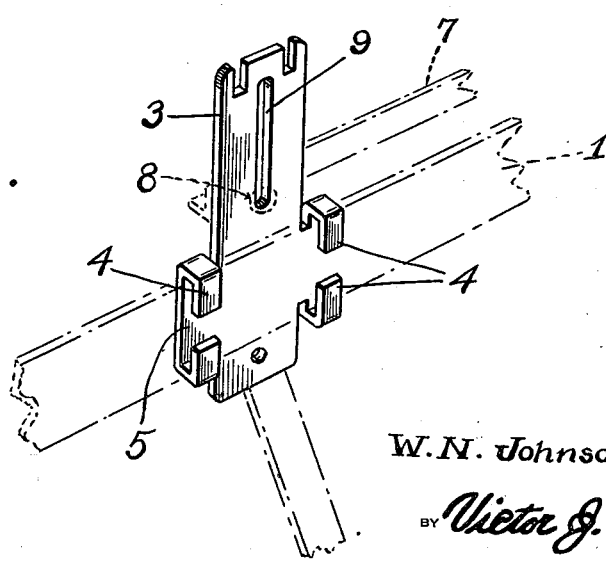
Figure 6 is a perspective view of the slide.

As shown in these views, I attach a track bar 1 to the saw frame A by a bracket 2. The bar is supported slightly in front of the frame and parallel therewith, with a part extending a considerable distance beyond the frame. A slide 3 has ears 4 formed on its offset parts 5, which ears are bent over the bar so that the slide is movably supported on the bar. The guard frame 6 has an arm 7 thereon which carries a bolt 8 which engages a vertical slot 9 in the slide so that the arm is pivotally and movably supported on the slide. The frame has a straight lower edge which slides on the front edge of the table part of the frame and said guard frame is covered with wire mesh 10 or the like. The front part of the frame is formed with a projection 11, the front edge of which is beveled so that the guard will ride up over the beam or log being sawed.

A bar 12 has its upper end pivoted to the lower end of the slide 3 and this bar is connected by the links 13 and 14 with the oscillating saw carrier B so that the bar 12 is caused to move with the carrier and this movement of the bar will cause the slide 3 to move back and forth on the track bar 1. Thus the guard will move with the saw C as the same moves back and forth so that the saw will be guarded at all times. As the guard approaches the work piece, its beveled end will strike the same and it will ride up said piece, as shown in dotted lines in Figure 1. This movement is permitted by the slot and bolt connection between the arm 7 and the slide 3.

In order to permit the device to be applied to different sizes of saw devices, I make the parts adjustable by making the link 14 of two sections, one of which is provided with the slots 15 for receiving the bolts 16 which connect the two parts together and by providing the link 13 and bar 12 with a plurality of holes 17 for receiving the bolt which connects these parts together.

From the foregoing, it will be seen that the guard moves with the saw in its forward and backward movement so that the saw is guarded at all times and that the guard can be easily moved out of the way of the saw when the saw is to be changed or otherwise acted upon.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A sawing machine comprising a frame, an oscillating saw carrier supported in the frame, a track bar connected with the frame, a slide on the bar, a guard frame pivotally connected with the slide and slidable on a part of the saw frame, a bar pivoted to the slide and upper and lower links connecting the bar with the carrier.

2. A sawing machine comprising a frame, an oscillating saw blade carrier supported by the frame, a track bar connected with the frame, a slide on the bar having a vertical slot therein, a guard frame, a pin passing through a part of the same and through the slot, the free end of the frame having a beveled part for riding over a work piece placed on the main frame, said guard frame having a part sliding on the main frame, a bar pivoted to the slide and links connecting the bar with the blade carrier.

3. A sawing machine comprising a frame, an oscillating saw blade carrier supported by the frame, a track bar connected with the frame, a slide on the bar having a vertical slot therein, a guard frame, a pin passing through a part of the same and through the slot, the free end of the frame having a beveled part for riding over a work piece placed on the main frame, said guard frame having a part sliding on the main frame, a bar pivoted to the slide, links connecting the bar with the blade carrier, means for adjustably connecting the upper link with the bar and means for permitting the lower link to be adjusted as to its length.

In testimony whereof I affix my signature.

WILLIAM N. JOHNSON.